United States Patent [19]

Crane et al.

[11] Patent Number: 5,703,702
[45] Date of Patent: Dec. 30, 1997

[54] HOLOGRAPHIC SYNTHESIS

[76] Inventors: Patrick E. Crane; Ronnie C. Lau, both of 6101 Johns Rd., Ste. 6, Tampa, Fla. 33634

[21] Appl. No.: 117,708

[22] Filed: Sep. 8, 1993

[51] Int. Cl.$^6$ .................................. G03H 1/08; G03H 1/10
[52] U.S. Cl. ........................ 359/1; 359/9; 359/10; 359/11; 359/21
[58] Field of Search ........................ 359/10, 11, 21, 359/26, 223, 853, 1, 9, 15, 32, 27, 900; 372/70

[56] References Cited

U.S. PATENT DOCUMENTS

| | | |
|---|---|---|
| 3,651,498 | 3/1972 | Magill et al. . |
| 3,901,578 | 8/1975 | Hudson . |
| 4,094,011 | 6/1978 | Nagao . |
| 4,580,151 | 4/1986 | Bamba . |
| 4,677,529 | 6/1987 | Lesh . |
| 4,785,459 | 11/1988 | Baer .................................. 372/70 |
| 4,793,699 | 12/1988 | Tokuhara .......................... 359/223 |
| 4,908,832 | 3/1990 | Baer .................................. 372/70 |
| 4,988,153 | 1/1991 | Paek . |
| 5,170,269 | 12/1992 | Lin et al. ........................... 359/846 |

*Primary Examiner*—Ricky D. Shafer
*Attorney, Agent, or Firm*—James Creighton Wray

[57] ABSTRACT

A tight packed array of amplitude controlled in-phase light emitters produces dynamic real holographic images. A partially reflecting mirror is applied to a planar array of amplitude controlled laser diode emitters which are stimulated by each other. The emitters are forced into phase with each other by partially reflecting light energy from adjacent row and column elements onto each other. Incident energy stimulates the element receiving the energy to fire in phase with the incident energy. The array may be forced in phase by directly illumination from a master laser. A single laser is used to illuminate a flat surface containing an array of transmissive apertures which act as emitters. Amplitudes are controlled by liquid crystals. Light from the emitters forms an image which changes according to amplitudes of the individual emitters. Optical focal plane reducers reduce the effective inter element spacing.

20 Claims, 2 Drawing Sheets

HOLOGRAPHIC SYNTHESIS

BACKGROUND OF THE INVENTION

The recording and emitting of holographic images are well known. Usually an object is illuminated with a coherent light source, and the interference of reflected rays is recorded as interference patterns throughout the holographic film. In the prior art, illuminating the film with a coherent light source illuminates the photographically emitted interference patterns and recreates the apparent reflected light, allowing a real or an apparent three-dimensional image of the object to be viewed through the use of the holographic film. When the coherent light is extinguished, the image is unreadable.

A need exists for holographic synthesis in which a real image may be created or sustained, or created and sustained under a computer control.

SUMMARY OF THE INVENTION

Instead of illuminating a photographic recording of the interference patterns to reproduce a holographic image, the photographic recording is replaced with a dense array of emitters. The holographic image is replicated when amplitude modulated emitters are in phase. The emitters are individually amplitude controlled to replicate the interference pattern of a hologram, and there are sufficient emitters, densely enough packed to provide the information recorded in the photographic hologram recording.

Methods of accomplishing the invention are provided.

In one embodiment, a partially reflecting mirror is applied to a planar array of equally spaced laser diode emitters which can be stimulated by each other. This is an application of a microwave antenna technique called image plane arrays.

Direct illumination of an array of emitters by a master laser is an alternative.

A single laser is used to illuminate a flat surface containing an array of transmissive apertures which act as emitters in a third embodiment.

In the first embodiment, all of the diodes participate in creation of the image. Partial reflection accomplishes the desired object of forcing all the emitters into phase with each other by partially reflecting the energy from elements in rows and columns onto adjacent elements in adjacent rows and columns. The resulting incident energy stimulates the element receiving the energy to move in phase toward the incident energy.

The light emitted by the diodes emits interference patterns which create apparent three-dimensional images.

When the elements are precisely spaced on the substrate and the mirror distance is precisely held and adjusted, the elements are caused by the mutually induced coupling to all elements to radiate in phase with each other.

The advent of integrated circuit technology and other solid state lasing devices renders it possible to fabricate a hologram synthesizer capable of emitting vivid real imagery by utilizing arrays of emitters wherein each element is capable of using very little (<0.1 mW) power, if individual amplitude control of the elements is invoked.

Preferably, diagonal coupling between elements is suppressed. Seedable diode technology may be used. The diodes may emit into a dielectric material, the exit surface of which performs the partial reflection function, and the thickness of which is precisely controlled.

One method of holographic synthesis invention lies in phase locking laser diodes together via a partially reflecting mirror. Holograms are synthesized from a planar array of emitters emitting in phase, under individual amplitude control, and closely enough spaced to provide a Huygens surface emulation of a hologram.

The invention is accomplished by using either individually addressable laser diode arrays or liquid crystal control of an emitting surface illuminated by a master laser through a plate having small apertures. It is desirable to achieve the inter-element spacing of approximately 1 wavelength in an array of individually controlled emitters to provide for a Huygens surface. A limitation of technology is the inter-element spacing of the diode arrays and in the liquid crystal arrays. A structure provides for utilization of focal plane transformation optics to project a focal plane in which the array is physically located onto another focal plane of reduced size.

The particular image emitted via synthesis is a real image, rather than the virtual image. Energy transmitted through the array will appear as a real image.

The individual laser diodes are coherent and, when phase locked each to each, they act as a single source.

This invention provides the ability to synthesize images without the use of a photographic process, emit it dynamically, move it under computer control, and provide great image intensity.

Various combinations of mirror scanning, time sharing, interlacing and linear arrays of emitters may be used to stimulate a planar array. The array need not be planar. Emitters may be scanned by either a prism or a mirror to reduce the number of diodes required. In addition, the density of the linear array may effectively be increased by means of interlacing scans.

In one form, holographic images are reproduced by an array of laser diodes. A partially reflecting mirror is applied to a planar array of equally spaced laser diodes which are stimulated by each other. All of the emitters are forced into phase with each other by partially reflecting the energy from adjacent row and column elements onto each other. Incident energy results which stimulates the element receiving the energy to fire in phase with the incident energy. Alternatively, the array may be directly illuminated by a master laser.

One holographic apparatus has an array of individual energy-emitting elements. An exciter in-phase excites the elements for emitting an overall image from the individual in-phase energies emitted by the elements.

Energy emitted by the elements is individually controlled. In one embodiment, the elements are individual amplitude controlled diodes, and the energy is light.

An exciter is a partially reflecting mirror for reflecting energy from the diode elements to adjacent elements for in-phase stimulating of the adjacent elements. The elements are arranged in rows and columns for partially reflecting energy from the elements onto adjacent elements in adjacent rows and columns for stimulating the adjacent elements.

The elements are precisely spaced on the substrate, and the mirror distance is precisely held and adjusted for partially reflecting energy to adjacent elements. The elements are tightly packed and each element emits less than about 0.1 mW of power. Elements may be positioned in non planar arrays.

In one form, the exciter has a precisely controlled thickness of dielectric material and an exit surface facing away from the elements. The exit surface is partially reflective for reflecting energy back to adjacent elements.

One embodiment uses a master laser as an exciter for firing the diode elements in phase. Another embodiment uses a master laser to illuminate closely spaced apertures having intensities controlled by liquid crystals.

One holograph image apparatus has a dense array of individually amplitude-controlled emitters for providing a holographic image. An exciter for in-phase stimulation of the emitters has an optical element for directing light to the emitters.

One form of the optical element comprises a master laser and a collimating lens for stimulating in-phase light emission by laser diodes or by small energy emitting apertures.

The master laser provides in-phase energy to the emitters, which are individually amplitude controlled. Another form of the optical element is a partially reflecting mirror which reflects light to adjacent amplitude controlled laser diode emitters for causing them to emit in phase.

A method of producing holographic images excites light emitters in a medium with light energy and releases energy from the emitters in-phase while controlling amplitude of light from each emitter.

Light energy is partially reflected from the emitters back to the emitters from a partially reflecting mirror to excite an adjacent emitter in phase.

The duration of light of each emitter is sufficiently long so that light emitted by an adjacent emitter is reflected back to an adjacent emitter, which is excited and emits light while the first emitter is still emitting light.

In a preferred embodiment, the light energy by the emitters remains active until a source of power is removed from the emitters. The in phase emitters controlled in amplitude excite patterns of light which are viewed as a real image. Changing the amplitudes such as by computer control of individual diodes and of translucence of liquid crystals changes the patterns and creates dynamic images.

The intensity of each emitter is coordinated, for example, by a programmed intensity, which is coordinated by a computer. As an example, the computer may scan the rows and columns imparting an intensity control to individual emitters. Each emitter may be directly connected to the controller.

The focal plane of the emitters may be effectively reduced by a focal plane reducer such as a convergent lens.

These and further and other objects and features of the invention are apparent in the disclosure, which includes the above and ongoing written specification, with the claims and the drawings.

DETAILED DESCRIPTION OF THE DRAWINGS

Figure 1:
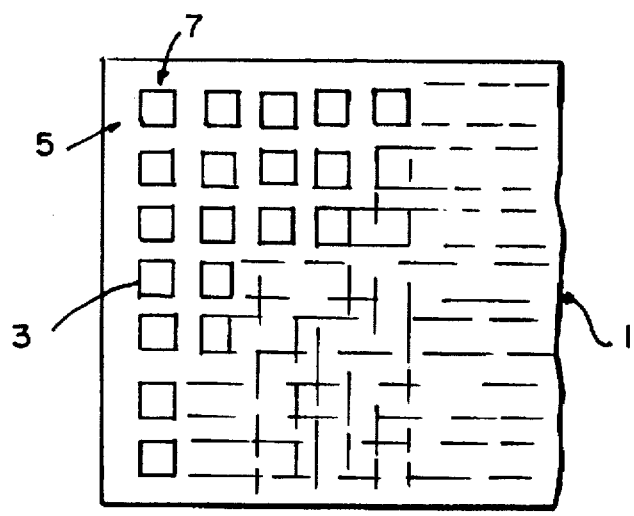
FIG. 1 is a schematic plan view of an emitter array in a hologram image creating device.

Referring to FIG. 1, a holographic image producer is generally indicated by the numeral 1. Densely packed emitters 3 are arranged in rows 5 and columns 7 in a substrate 9. Each emitter emits light in phase and at a controlled intensity to cooperate with all of the emitters in the array to create a holographic image.

Figure 2:
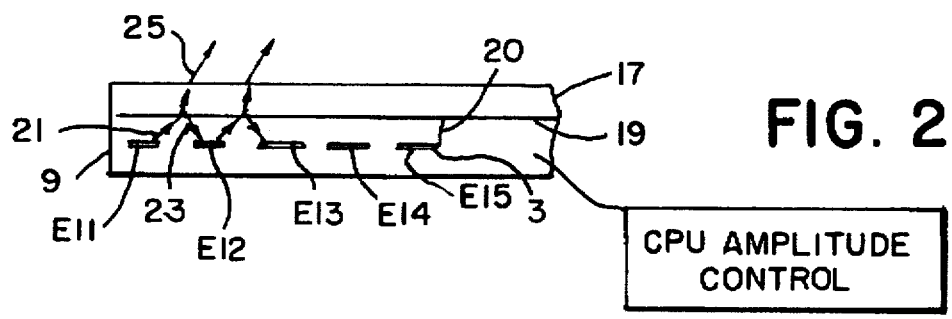
FIG. 2 is an elevational cross-sectional schematic detail of laser diode emitters arrayed in a substrate covered by a partially reflective mirror.

FIG. 2 is a schematic partial cross-sectional detail of the photograph holographic image producer 1. A substrate 9 holds the emitters 3, which are numbered E11–15. A partially reflective mirror 17 with reflective surface 19 is placed a controlled distance 20 above the emitters. Light 21 emitted by the emitters is partially reflected 23 to adjacent emitters to fire all of the emitters in phase. The combined light 25 leaves the partially reflective mirror and forms a three-dimensional holographic image with dark and light and varied grey areas.

The intensity of each emitter is precisely controlled according to a precise intensity level control in power supplied to the individual elements. Each emitter may have a power terminal and a control terminal to precisely control the level of output from the emitter. It is intended that the emitters emit varied light over a long period of time so that the images created by the escaping light 25 are dynamic. Alternatively, the emitters may emit light in light bursts of durations sufficiently long to excite adjacent emitters by reflection from the partially reflective mirror, and to form sequential images which an observer, for example a human eye, a film, a light sensor or a pattern recognition apparatus may observe as moving images.

Figure 3:
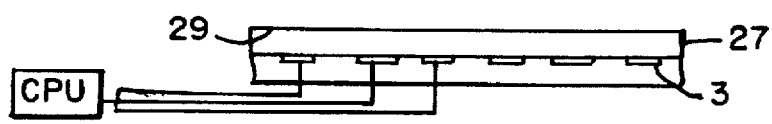
FIG. 3 is a partial elevational cross-sectional schematic detail of emitters in the surface of a substrate covered by a dielectric mirror, the outer surface of which partially reflects light for energizing adjacent emitters.

As shown in FIG. 3, the emitters 3 may emit light directly into a dielectric layer 27, the upper surface 29 of which forms the partially reflective mirror surface. In all cases, the partially reflective layers are formed as thin films.

Figure 4:
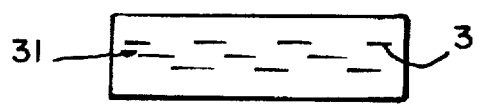
FIG. 4 schematically shows emitters in a tightly packed array.

FIG. 4 is a schematic representation of tightly packed emitters 3 arranged in a non planar array 31.

Figure 5:
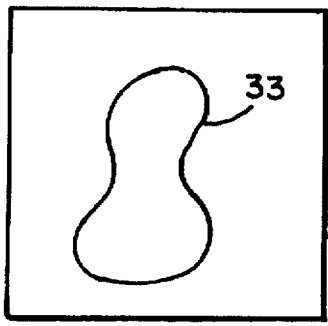
FIG. 5 is a plan view schematically showing holographic image generation.

FIG. 5 schematically shows a holographic image 33 from a device 1 in which the emitters have been driven in phase with controlled amplitudes to emit light interference patterns which form a perceptible real image. The patterns form images which have dynamic three-dimensional quality.

Figure 6:
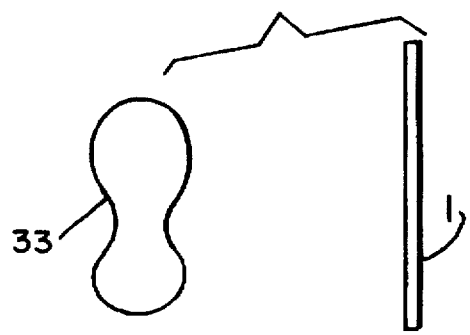
FIG. 6 is a schematic elevational view of the image generation.

FIG. 6 schematically shows an elevation of the same image producer 1 and the real image 33 produced by the light emitters therein.

Figure 7:
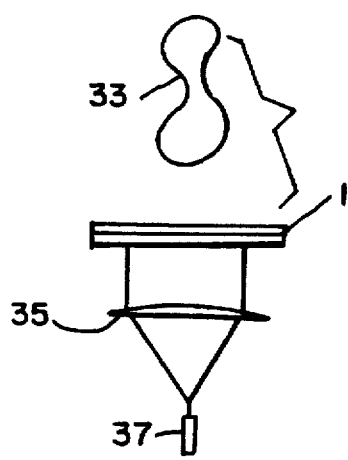
FIG. 7 shows laser exciting of the emitters in a holographic apparatus.

FIG. 7 shows schematically the concurrent firing of all of the emitters by flooding the emitters with light from a light source such as, for example, a master laser. The light source may flood the emitters from the back. The collimator 35 may illuminate the laser diode emitters in holographic generator 1 with light from the laser 37 to force the diodes to emit in phase.

Figure 8:
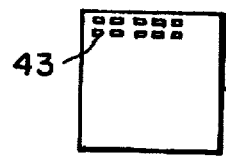
FIG. 8 is a schematic representation of an aperture plate for use in an embodiment of the invention.
Figure 10:
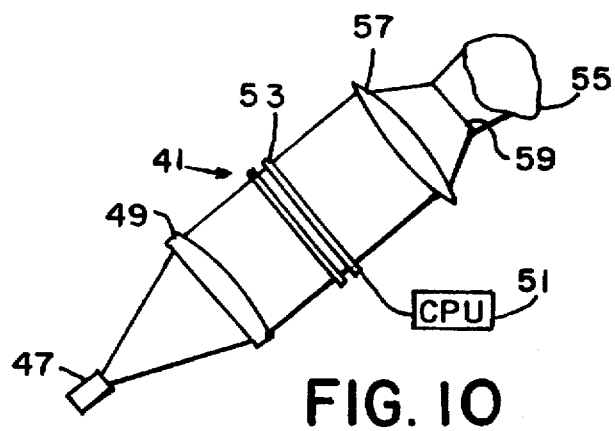
FIG. 10 is a schematic representation of an embodiment of the invention using an aperture plate, a liquid crystal plate and a focal plane reducer to create a dynamic holographic image.
Figure 9:
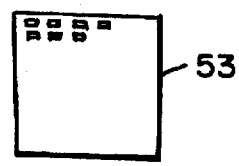
FIG. 9 is a schematic representation of a liquid crystal plate for use with the aperture plate.

FIGS. 8, 9 and 10 schematically show an image generator 41 which uses small apertures 43 in an aperture plate 45 as light emitters to emit light from a laser source 47. The coherent light is collimated by lens 49 so that the emitters 43 emit light in phase. A central processing unit 51 controls liquid crystal amplitude control plate 53 to vary the amplitude of light from each emitter aperture 43 for forming interference patterns of light and producing dynamic three-dimensional real images 55.

In plate 45 the apertures are spaced at one micron or less, and the transmission ratio is about 95%.

A focal plane reduction optic 57 reduces the effective size of spacings of apertures 43 on plate 45 and produces reduced effective spacings on plane 59.

While the invention has been described with reference to specific embodiments, modifications and variations of the invention may be constructed without departing from the scope of the invention, which is defined in the following claims.

We claim:

1. Apparatus for generating holograms comprising an array of individual controlled energy-emitting elements, an exciter spaced from the elements for in-phase exciting of the elements for emitting an overall holographic image from combined individual in-phase energies emitted by the individually controlled energy-emitting elements.

2. The apparatus of claim 1, wherein the elements are light emitting diodes and the energy is light.

3. The apparatus of claim 1, wherein the exciter comprises a partially reflecting mirror.

4. The apparatus of claim 1, wherein the exciter comprises a master laser for firing the elements in phase.

5. Apparatus for generating holograms comprising an array of individually controlled energy-emitting elements, an exciter for in-phase exciting of the elements for emitting an overall holographic image from in-phase energy emitted by the individually controlled elements, wherein the exciter further comprises a partially reflecting mirror for reflecting energy from the elements to adjacent elements for stimulating the adjacent elements.

6. The apparatus of claim 5, wherein the elements are arranged in rows and columns for partially reflecting energy from the elements onto adjacent elements in adjacent rows and columns for stimulating the adjacent elements.

7. The apparatus of claim 5, wherein the elements are spaced on a substrate, and wherein the mirror is held at an adjustable distance from the elements for partially reflecting energy to adjacent elements.

8. The apparatus of claim 5, wherein the exciter comprises a precisely controlled thickness of a dielectric material, having an exit surface facing away from the elements, and wherein the exit surface is partially reflective for reflecting energy back to excite adjacent elements.

9. Apparatus for generating holograms comprising an array of individually controlled energy-emitting elements, an exciter for in-phase exciting of the elements for emitting an overall holographic image from in-phase energy emitted by the individually controlled elements, wherein the elements are tightly packed and each element produces less than about 0.1 mW of power.

10. Apparatus for generating holograms comprising an array of individually controlled energy-emitting elements, an exciter for in-phase exciting of the elements for emitting an overall holographic image from the in-phase energy emitted by the individually controlled elements, wherein the elements are small apertures in a surface and the energy is light.

11. The apparatus of claim 10, further comprising a liquid crystal plate overlying the apertures for controlling amplitudes from the apertures.

12. Image apparatus for generating a hologram comprising a dense array of individually amplitude-controlled emitters for providing light, an exciter spaced from the emitters for in-phase stimulation of the emitters for emitting an overall holographic image, the exciter comprising an optical element for exciting at least some of the emitters.

13. The apparatus of claim 12, wherein the elements are positioned in a non planar array.

14. Apparatus for generating holograms comprising a dense array of individually amplitude-controlled emitters for providing light, an exciter for in-phase stimulation of the emitters for emitting and overall holographic image, the exciter comprising an optical element for exciting at least some of the emitters, wherein amplitude control of individual emitters is accomplished by liquid crystals.

15. Apparatus for generating holograms comprising a dense array of individually amplitude-controlled emitters for providing light, an exciter for in-phase stimulation of the emitters for emitting and overall holographic image, the exciter comprising an optical element for exciting at least some of the emitters, wherein the emitters are apertures, and wherein the optical element comprises a master laser for stimulating light emission by the apertures.

16. A method of generating holograms for creating holographic images, comprising providing an array of individual light emitters, individually controlling light intensity from the emitters, and exciting said light emitters with in-phase light energy for releasing energy from the emitters in-phase to form holographic images.

17. The method of claim 16, further comprising providing a partially reflecting mirror spaced from the emitters, partially reflecting light energy released from the emitters back to adjacent emitters with the partially reflecting mirror for exciting the adjacent emitters.

18. The method of claim 16, further comprising providing an optical focal plane reducers are used to reduce the effective inter element spacing to one wavelength or less of the emitting surface.

19. The method of claim 16, further comprising providing a computer for connecting with the emitters, wherein the process of creating holographic images is controlled by the computer.

20. The method of claim 16, wherein the exciting light emitters comprise using a single laser to illuminate a flat surface containing an array of transmissive apertures which act as emitters.

* * * * *